United States Patent [19]

Mimura et al.

[11] Patent Number: 4,925,475
[45] Date of Patent: May 15, 1990

[54] METHOD AND APPARATUS FOR MANUFACTURING PREFORM FOR FLUORIDE GLASS FIBER

[75] Inventors: Yoshinori Mimura, Wako; Yukio Noda, Saitama; Naoki Norimatsu, Tokyo; Hideharu Tokiwa, Yono; Osamu Shinbori, Tokyo, all of Japan

[73] Assignee: Kokusai Denshin Denwa Kabushiki Kaisha, Tokyo, Japan

[21] Appl. No.: 299,268

[22] Filed: Jan. 23, 1989

[30] Foreign Application Priority Data

Jan. 29, 1988 [JP] Japan .................................. 63-17109

[51] Int. Cl.[5] ...................... C03B 19/00; C03C 27/00
[52] U.S. Cl. ........................................... 65/48; 65/23; 65/39; 65/152; 65/153
[58] Field of Search ..................... 65/23, 39, 48, 152, 65/153

[56] References Cited

U.S. PATENT DOCUMENTS

| 586,188 | 7/1897 | Houghton | 65/48 |
| 3,221,915 | 12/1965 | Gort et al. | 65/153 UX |
| 3,533,905 | 10/1970 | O'Meara, Jr. | 65/48 X |
| 3,556,756 | 1/1971 | Andrysick | 65/23 |
| 4,305,744 | 12/1981 | Carette et al. | 65/48 X |
| 4,323,381 | 4/1982 | Matsuyama et al. | 65/32 |
| 4,740,225 | 4/1988 | Cocito et al. | 65/23 X |
| 4,750,926 | 6/1988 | Berkey | 65/23 X |

Primary Examiner—Arthur Kellogg
Attorney, Agent, or Firm—Emmanuel J. Lobato; Robert E. Burns

[57] ABSTRACT

A method and an apparatus for manufacturing a fluoride glass fiber preform are disclosed which preclude the step of pouring a glass melt into a mold from a crucible, and hence permit the fabrication of a long, homogeneous fluoride glass fiber preform free from foreign substances and air bubbles leading to scattering and which also allow ease in the fabrication of a preform having an elliptic core portion for drawing a polarized wave retaining fiber.

9 Claims, 2 Drawing Sheets

METHOD AND APPARATUS FOR MANUFACTURING PREFORM FOR FLUORIDE GLASS FIBER

BACKGROUND OF THE INVENTION

The present invention relates to a method and apparatus for the manufacture of a preform for drawing into fluoride glass fiber which is employed for long distance optical communication utilizing light of a 2 to 3 $\mu m$ band wavelength.

Fluoride glass is now attracting attention as a material for optical fiber for optical communication in the 2 to 3 $\mu m$ band and is expected to achieve an ultra-low loss below 0.01 dB/km theoretically. Since the fluoride glass is liable to crystallize, however, it is impossible to apply conventional quartz-series optical fiber preform manufacturing method such as a MCVD process and VAD process to the fabrication of a preform for fluoride glass fiber. The manufacture of a new fiber preform is required for the materialization of such a low-loss fluoride glass optical fiber, but no satisfactory manufacturing method is available at present.

Heretofore, there have been proposed for the manufacture of such a fluoride glass optical fiber preform (1) a build-in casting method (Mitach et al., Jpn. J. Appl. Phys. 21, L55 (1982)), (2) a rotational casting method (Tran et al., Electron Lett. 18, 657 (1982)), (3) a suction casting method (Ohishi et al., Electron Lett. 22, 1034 (1986)), (4) a modified build-in casting method (Sakaguchi et al., J. Lightwave Technol. LT-5, 1219 (1987)) and a CPD method (Nakai et al., Jan. J. Appl. Phys. 25, L704 (1986)). The methods (1) to (4) are all so-called casting methods which employ a metal mold, and the method (5) is a crucible method which directly draws out a preform from a double crucible loaded with core glass and cladding glass separately. At present, relatively low-loss optical fibers are obtainable with the casting methods, which will hereinbelow be described in brief.

In the method (1), a cladding glass melt prepared in a crucible is poured into a metal mold, which is immediately turned upside down to let the inner unsolidified portion of the glass melt run out therefrom to form a cladding tube, and then a core glass melt in another crucible is poured into the cladding tube, thus obtaining a waveguide structure.

In the method (2), a cladding glass melt prepared in a crucible is poured into a rotating mold to form a cladding tube through utilization of a centrifugal force, and then a core glass melt in another crucible is poured into the cladding tube, thus obtaining a waveguide structure.

In the method (3), a cladding glass melt prepared in a crucible is poured into a cylindrical metal mold having in its bottom a liquid reservoir and, before the inner portion of the cladding glass melt is solidified, a core glass melt in another crucible is poured into the mold and allowed to be sucked into the core portion of the cladding glass through utilization of its shrinkage in volume by cooling, thus obtaining a waveguide structure.

In the method (4), a cladding glass melt prepared in a crucible and a core glass melt in another crucible are poured into a metallic mold in that order and, before they are completely solidified, the inner portion of the cladding glass melt is drained out therefrom through a hole in its bottom to thereby introduce the core glass melt into the solidified cladding glass tube, thus obtaining a waveguide structure.

These casting methods have problems which are attributable to the inclusion of the step in which the cladding glass melt and the core glass melt are each poured into the mold through an outlet in the top of the crucible.

A first problem presented by the inclusion of this step lies in that a foreign substance adhering to the outlet of the crucible is mixed into the glass melt when the glass melts are poured into the mold. This foreign substance results from volatilization of the glass component during melting of the glass and is mostly a Zr compound such as $ZrO_2$. It is difficult, with the present glass melting technology, to prevent such a foreign substance from adhering to the crucible.

A second problem is the mixing of air bubbles into the melt when the glass melts are poured into the mold. Since an ordinary mold has a long and thin configuration of 7 to 10 mm$\phi$ in aperture diameter and 100 to 200 mm in length, the mixing of air bubbles cannot completely be prevented. Especially, in case of pouring the core glass melt into the cladding tube as in the build-in casting method (1) and the rotational casting method (2), the aperture diameter of the mold is further reduced, so that air bubbles get mixed into the melt more easily.

A third problem is nonuniformity of the thickness of the cladding layer or eccentricity of the core. When the melt is poured into the mold, it must be slowly poured into the mold tilted so as to minimize the mixing of air bubbles; this consumes an appreciable amount of time. On this account, solidification of the melt occurs first at the bottom of the mold and proceeds upwardly, leading to nonuniformity of the thickness of the cladding layer or eccentricity of the core.

A fourth problem is crystallization of glass by a temperature rise near the inlet port of the mold and contamination with volatile materials from the glass melt. The melt and the mold temperature are usually about 600° C. and about 250° C., respectively, when the melt is poured into the mold. Because of such high melt temperature, the temperature of the mold rises in the vicinity of its inlet port, giving arise to partial crystallization of glass during the pouring of the melt into the mold. Further, volatile materials from the glass melt become attached to the mold around the inlet port and get mixed into the glass.

A fifth problem is a difficulty in removing water adsorbed to the mold. Adsorbed water adheres to the surface of the mold once exposed to the atmosphere and is mixed into the glass, causing an increase in the absorption loss or crystallization of the glass. A simple method of removing such adsorbed water is to heat the mold at temperatures above 800° C. in a vacuum or dry gas atmosphere, but ordinary brass mold plated with gold, platinum or similar noble metals undergo a change in quality when heated at such high temperature. Therefore, nothing is done for removing water adsorbed to the mold surface at present.

As described above, preforms for the fluoride glass fiber prepared by the conventional methods have locally mixed therein foreign materials and air bubbles and are unsatisfactory also in suppression of cyrstallization, removal of water content and control of the thickness of the cladding layer. Accordingly, a fiber drawn from such a preform is inhomogenous; even a fiber drawn as long as hundreds of meters provides a low-loss portion only tens of meters at the longest and even this low-loss portion also suffers from a scattering loss due to an extrinsic factor except Rayleigh scattering. Moreover, the conventional methods described above are intended primarily for the manufacture of ordinary optical fibers with no polarization retention, and hence do not take into account the fabrication of a polarization retaining fiber which is useful for coherent communication.

BRIEF SUMMARY OF THE INVENTION

It is therefore an object of the present invention to provide a fluoride glass fiber preform manufacturing method and apparatus which preclude the step of pouring a glass melt into a mold from a crucible, and hence permit the fabrication of a long, homogenous fluoride glass fiber preform free from foreign substances and air bubbles leading to scattering and which also allow ease in the fabrication of a preform having an elliptic core portion for drawing a polarized wave retaining fiber.

To attain the above object, the present invention has the following constitution:

(1) A fluoride glass fiber preform manufacturing method which is characterized by the inclusion of: a first step in which a crucible open at both ends is disposed in a cylindrical vessel open at both ends and provided with cooling means and a liquid reservoir, cladding glass and core glass a core are loaded into the cylindrical vessel and the crucible, respectively, with their lower open ends closed, and then molten by heating means; and a second step in which the glass melt in the cylindrical vessel is cooled by the cooling means, and when the outer portion of the glass for the cladding layer is cooled and solidified but its inner portion is still in the molten state, the lower ends of the cylindrical vessel and the crucible are opened to let the inner cladding glass melt run out into the liquid reservoir and introduce the core glass melt into the void from which the cladding glass melt has run out, and then the glass is cooled and solidified in its entirety, providing a core-cladding structure.

(2) A fluoride glass fiber preform manufacturing apparatus which is characterized by the provision of: a cylindrical vessel open at both ends, for loading cladding glass; a crucible open at both ends and disposed in the cylindrical vessel, for loading core glass; means for opening and closing the lower ends of the cylindrical vessel and the crucible; heating means for melting the cladding glass and the core glass; cooling means for cooling the cladding glass melt at such a cooling rate that its inner portion is still in the molten state when the outer portion is already cooled and solidified; and a liquid reservoir for receiving the glass melt having run out of the cylindrical vessel through its lower open end.

BRIEF DESCRIPTION OF THE DRAWINGS

The present invention will be described in detail below with reference to the accompanying drawings, in which.

DETAILED DESCRIPTION

Embodiment 1

Figure 1A:
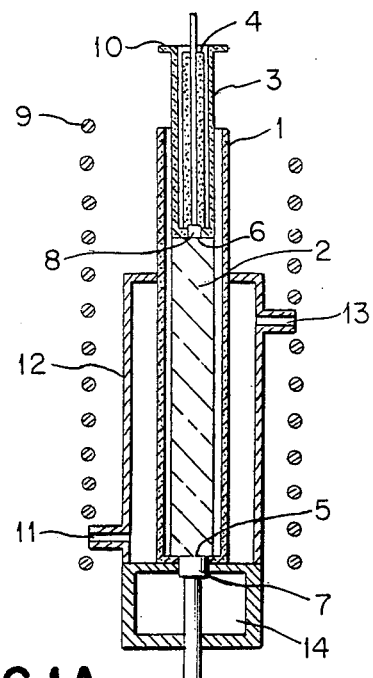
FIG. 1A is a longitudinal section view of a first embodiment of an apparatus, according to the invention and illustrates a preliminary step of the method of the invention.
Figure 1B:
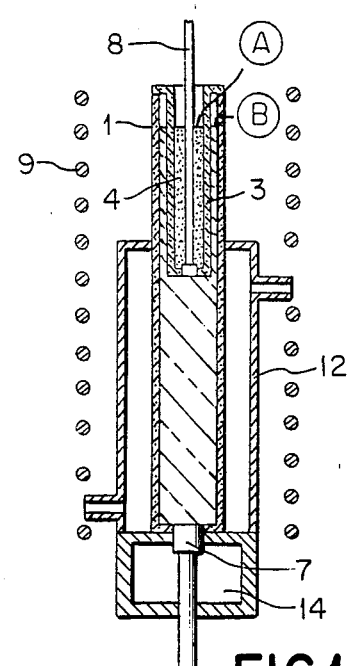
FIG. 1B is a longitudinal section view of the apparatus of FIG. 1A and illustrates a second step of the method of the invention.

A description will be given, with reference to FIGS. 1A to 1E, of the manufacturing method and apparatus of the present invention. In FIGS. 1A and 1B, reference numeral 1 indicates a cylindrical vessel, 2 cladding glass, 3 an inner crucible, 4 core glass, 5 a hole made in the lower end of the cyclinder vessel 1, 6 a hole made in the lower end of the inner crucible 3, 7 a plug for the cylindrical vessel 1, 8 a plug for the inner crucible 3, 9 a high-frequency coil, 10 a flange of the inner crucible 3, 11 a gas inlet port, 12 a cooling tube, 13 a gas outlet port, and 14 a liquid reservoir.

Figure 1C:
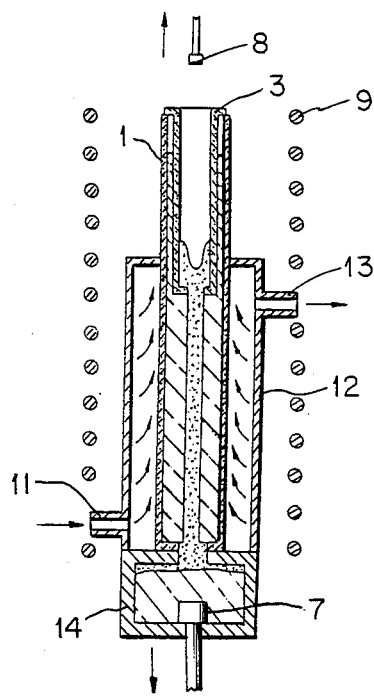
FIG. 1C is a longitudinal view of the apparatus of FIGS. 1A and 1B and illustrates a third step of the method of the invention.
Figure 1D:
FIG. 1D is a axial section view of a fluoride glass fiber preform made in the apparatus according to the invention.
Figure 1E:
FIG. 1E is a cross section view of the preform of FIG. 1D.

To start with, the cylindrical vessel 1 and the inner crucible 3 are heated at a temperature above 800° C. for an hour or so to remove water adsorbed to them after which the cladding glass 2 and the core glass 4 are loaded into the cylindrical vessel 1 and the inner crucible 3, respectively, and then the inner crucible 3 is placed in the cylindrical vessel 1. The manufacturing method of the present invention features easy removal of water through high temperature heating, because the whole apparatus can be formed of carbon. With a view to increasing the packing density, the cladding glass 2 is packed in a columnar form and the core class 4 in a pipe-like form. The holes 5 and 6 made in the bottoms of the cylindrical vessel 1 and the inner crucible 3 are stopped by the plugs 7 and 8, respectively. The cylindrical vessel 1 may also be split into two or three parts lengthwise thereof so as to allow ease in taking out a preform ultimately produced. As the material for the cylindrical vessel 1, the inner crucible 3 and the plugs 7 and 8 therefor, carbon is desirable from the viewpoints of its corrosion resistance to the fluoride glass and its wettability therewith, especially, glassy carbon is preferable. Noble metals such as gold and platinum are also highly resistant to corrosion by the fluoride glass; however, these noble metals are positive in the wet contact angle with the fluoride glass melt, and hence are defective in that the glass melt is liable to leak out through slight gaps of a split mold or a clearance between its hole and the plug. Besides, metal molds are attacked by a fluoride gas and cannot be used in a fluoride gas atmosphere. In contrast thereto, the carbon does not allow easy leakage of the glass melt because of its negative wet contact angle and is highly resistant to corrosion by the fluoride gas. Next, the cylindrical vessel 1 is heated by the high-frequency coil 9 to melt the cladding glass 2 and the core glass 4. As the cladding glass 2 is molten, the inner crucible 3 is lowered into the glass melt 2 and then fixed using its flange 10 as shown in FIG. 1B. The amounts of cladding glass 2 and core glass 4 are preadjusted so that their liquid levels (B) and (A) are substantially equal to each other when the inner crucible 3 is fixed as mentioned above. The reason for which the inner crucible 3 is lowered into the glass melt 2 is to prevent that volatile materials from the glass melt 4 adhere to the inner crucible 3. Further, the reason for holding the liquid levels of the glass melts 2 and 4 nearly equal to each other is to make the inner pressures of the glass melts 2 and 4, thereby preventing leakage of the melt 4 even if there is a slight gap between the hole 6 in the bottom of the inner crucible 3 and the plug 8. In a case where it is necessary to remove water, oxygen and similar impurities when melting the glass, they can be eliminated by melting the glass in a fluorine-series gas atmosphere or bubbling the glass melt with a fluorine series gas. After melting the glass at 800° C. for two hours or so, the glass melt 2 is forcibly cooled by introducing a cooling gas through the gas inlet port 11 into the cooling tube 12 uniformly throughout it and discharging the gas through the gas outlet port 13, as depicted in FIG. 1C. The cooling rate in this instance is such that the inner portion of the glass melt 2 is still in the molten state when its outer portion becomes hard. The cooling rate is controlled by adjusting the flow rate of the cooling gas. Inert gases such as He, Ar and $N_2$ are suitable for use as the cooling gas, but a liquid may also be used instead of such gases. With uniform blowing of the cooling gas against the cylindrical vessel 1, homogeneous cooling and solidification of the glass melt proceeds inwardly from its outer peripheral portion without causing thickness variations. The manufacturing method of the present invention performs rapid cooling of the glass melt by uniform blowing of the cooling gas instead of using a metal mold. This enables uniform cooling of the glass melt lengthwise thereof, permitting the fabrication of a long preform with no core eccentricity. In addition, since the glass is cooled in the vessel in which it was molten, the glass melt is not ever exposed to the atmosphere unlike in the casting methods; therefore, there is also an advantage such that impurities from the atmosphere can be prevented from mixing into the glass melt. When the thickness of the cooled and solidified portion of the glass reaches a desired value, the plugs 8 and 7 are pulled out of the holes of the inner crucible and the cylindrical vessel, letting the glass melt 2 along the center of the vessel 1 run out therefrom and into the liquid reservoir 14 while at the same time introducing the core glass melt 4 into the void defined in the cladding glass centrally thereof. When the diameter of the inner glass melt portion is so small that the glass melt cannot readily run down into the liquid reservoir 14, the glass melt can be sucked thereinto by evacuating the liquid reservoir 14 by use of a suitable means. Usually, foreign matters attributable to the volatilization of the glass component by the melting of glass are attached to the top end portions of the cylindrical vessel 1 and the inner crucible 3, but there is no possibility of such foreign matters getting mixed into the glass melts, because the core glass melt 4 is introduced into the cylindrical vessel 1 through the hole 6 in the bottom of the inner crucible 3. Besides, no air bubbles will be mixed into the glass because the both glass melts 2 and 4 are held in direct contact with each other. Of course, there is no contamination of the glass with volatile matters from the cladding and core glass melt 2 and 4 themselves, and since the core glass melt 4 is rapidly introduced into the cylindrical vessel, the glass temperature will not rise, and accordingly the glass will not crystallize. Thereafter, the glass is cooled and solidified throughout it and then taken out of the cylindrical vessel 1, obtaining a fluoride glass fiber preform of such a core-cladding structure as depicted in FIG. 1D. FIG. 1E is a cross-sectional view of the fluoride fiber preform thus produced, and its core and cladding portions are both circular in shape.

Embodiment 2

Figure 2A:
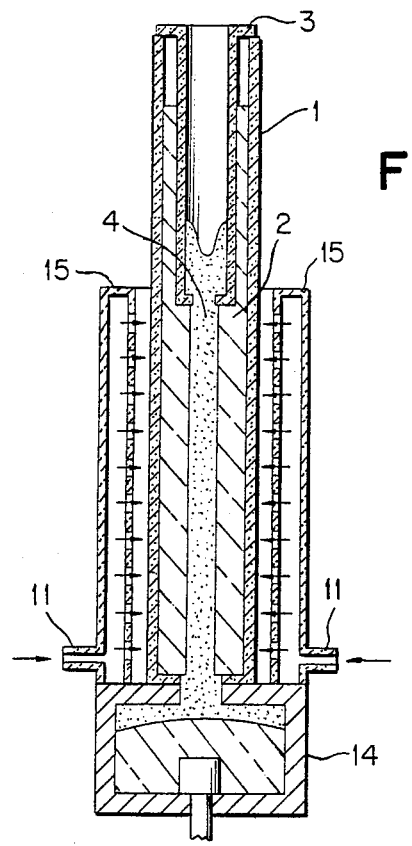
FIG. 2A is a longitudinal section view of a second embodiment of an apparatus according to the invention.
Figure 2B:
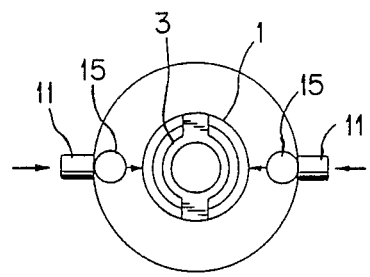
FIG. 2B is a top plan view of the apparatus illustrated in FIG. 2A.
Figure 2C:
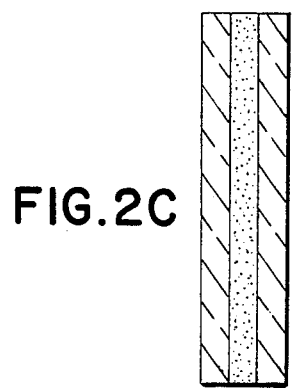
FIG. 2C is a cross section view of a second embodiment of a fluoride glass fiber preform according to the invention.
Figure 2D:
FIG. 2D is a cross section view of the glass preform in FIG. 2C illustrating an elliptical core thereof.

The manufacturing method of the present invention also permits easy fabrication of a preform which has an elliptic core portion, and a fiber drawn from such a preform can be employed as a polarized wave retaining fiber. FIGS. 2A to 2D are diagrams explanatory of an apparatus for manufacturing the preform having an elliptic core portion, FIG. 2A being a longitudinal-sectional view and FIG. 2B a top plan view. Reference numeral 15 indicates a pair of opposed cooling tubes. As shown in FIGS. 2A to 2D, the cladding glass melt 2 in the cylindrical vessel 1 is cooled by blowing gas against it from two directions by the use of the pair of opposed cooling tubes 15. By such cooling, the glass melt is cooled and solidified in the gas-blowing directions more rapidly than in the other directions, so that a preform having an elliptic core, such as shown in FIGS. 2C and 2D, can easily be produced.

As described above, according to the fluoride glass fiber preform manufacturing method and apparatus of the present invention, it is possible to produce a fluoride glass fiber preform which is long and uniform in thickness with no contamination with foreign matters and air bubbles leading to scattering, and a preform with an elliptic core can also be manufacture with ease. Moreover, since the apparatus can be formed solely of carbon which is highly resistant to corrosion, impurities resulting from the melting of glass can be removed by melting the glass in a fluorine-series gas atmosphere or by bubbling the glass melts with a fluorine-series gas. The use of carbon for the cylindrical vessel 1 and the inner crucible 3 virtually prevents the leakage therefrom of glass melts and the use of a split mold type configuration for the cylindrical vessel allows ease in taking out therefrom the manufactured preform. Besides, by adjusting the cooling rate to be nonuniform in the circumferential direction of the cylindrical vessel 1 in the second step of cooling and solidifying the glass melt, it is possible to obtain a polarization plane retaining fiber which has an elliptic core. Accordingly, the present invention permits the fabrication of a low-loss, long fluoride glass fiber and a polarized light retaining fiber.

What we claim is:

1. A method for the manufacture of a preform for a fluoride glass fiber, characterized by:
   a first step in which a cooling means and a liquid reservor are provided in association with a cylindrical vessel open at both ends, a crucible open at both ends is disposed in the cylindrical vessel, and cladding glass and core glass are loaded into the cylindrical vessel and the crucible, respectively, with their lower open ends plugged, and are molten by a heating means; and
   a second step in which cladding glass melt in the cylindrical vessel is cooled by the cooling means, and when the outer portion of the cladding glass melt is cooled and solidified but its inner portion is still in the molten state, the plugged lower open ends of the cylindrical vessel and the crucible are opened to let the inner portion of the cladding glass melt run out into the liquid reservoir and to introduce the core glass melt into the void from which the cladding glass melt has run out, and then the glass is cooled and solidified in its entirety, thereby forming a core-cladding layer structure.

2. A method for the manufacture of a preform for a fluoride glass fiber according to claim 1, characterized in that in the first step the cylindrical vessel is disposed in a closed vessel provided with fluorine-series gas introducing means and discharge means, and the melting of the glass takes place in a fluorine-series gas atmosphere or while bubbling the glass melts with a fluorine-series gas, thereby removing water, oxygen and like impurities during the melting of the glass.

3. A method for the manufacture of a preform for a fluoride glass fiber according to claim 1, characterized in that the cylindrical vessel and the crucible are made of carbon.

4. A method for the manufacture of a preform for a fluoride glass fiber according to claim 1, characterized in that the cylindrical vessel is a split mold.

5. A method for the manufacture of a preform for a fluoride glass fiber according to claim 1, characterized in that in the step of cooling and solidifying the cladding glass melt in the cylindrical vessel, the cooling rate in the circumferential direction of the cylindrical vessel is made nonuniform, thereby forming an elliptic core portion.

6. An apparatus for the manufacture of a preform for a fluoride glass fiber, comprising:
   a cylindrical vessel open at both ends for loading cladding glass;
   a crucible open at both ends for loading core glass, the crucible being disposed in the cylindrical vessel;
   means for opening and closing the lower open ends of the cylindrical vessel and the crucible;
   heating means for melting the cladding glass and the core glass;
   cooling means for cooling and solidifying the cladding glass melt at a cooling rate such that the inner portion of the glass melt is still in the molten state when its outer portion is already cooled and solidified; and
   a liquid reservoir for receiving the glass melt having run out of the cylindrical vessel through its lower open end.

7. An apparatus for the manufacture of a preform for a fluoride glass fiber according to claim 6, characterized in that the crucible, the cooling means and the liquid reservoir are disposed in a closed vessel provided with fluorine-series gas introducing means and discharge means.

8. An apparatus for the manufacture of a preform for a fluoride glass fiber according to claim 6, characterized in that the cylindrical vessel and the crucible are made of carbon.

9. An apparatus for the manufacture of a preform of a fluoride glass fiber according to claim 6, characterized in that the cylindrical vessel is a split mold.

* * * * *